US008687598B1

United States Patent
Prock (10) Patent No.: US 8,687,598 B1
(45) Date of Patent: Apr. 1, 2014

(54) METHOD FOR MANAGING HANDOFF IN A WIRELESS COMMUNICATION SYSTEM

(75) Inventor: John W. Prock, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 553 days.

(21) Appl. No.: 13/070,920

(22) Filed: Mar. 24, 2011

(51) Int. Cl.
*H04W 4/00* (2009.01)
*H04W 36/00* (2009.01)

(52) U.S. Cl.
USPC .......................... 370/332; 455/437; 455/442

(58) Field of Classification Search
None
See application file for complete search history.

(56) References Cited

U.S. PATENT DOCUMENTS

| | | | |
|---|---|---|---|
| 6,208,873 B1 | 3/2001 | Black et al. | |
| 6,256,301 B1 | 7/2001 | Tiedemann, Jr. et al. | |
| 6,351,651 B1 | 2/2002 | Hamabe et al. | |
| 6,594,499 B1 | 7/2003 | Andersson et al. | |
| 6,987,982 B2 | 1/2006 | Willenegger et al. | |
| 7,437,173 B2 | 10/2008 | Lee et al. | |
| 7,539,163 B2 | 5/2009 | Lin | |
| 7,813,754 B2 | 10/2010 | Usuda et al. | |
| 7,826,370 B1 | 11/2010 | Vargantwar et al. | |
| 7,830,854 B1 | 11/2010 | Sarkar et al. | |
| 7,965,141 B2 | 6/2011 | Dooper et al. | |
| 7,973,698 B1 | 7/2011 | Woodell et al. | |
| 2002/0115464 A1 | 8/2002 | Hwang et al. | |
| 2004/0092233 A1 | 5/2004 | Rudrapatna | |
| 2004/0106423 A1 | 6/2004 | McGowan et al. | |
| 2004/0176126 A1 | 9/2004 | Sato et al. | |
| 2004/0259560 A1 | 12/2004 | Hosein et al. | |
| 2005/0143113 A1 | 6/2005 | Lee et al. | |
| 2005/0153671 A1 | 7/2005 | Ichikawa | |
| 2007/0026865 A1 | 2/2007 | Yano et al. | |
| 2007/0191044 A1 | 8/2007 | Kostic et al. | |
| 2007/0243894 A1 | 10/2007 | Das et al. | |
| 2007/0298825 A1 | 12/2007 | Kayama et al. | |
| 2008/0057963 A1 | 3/2008 | Kayama et al. | |
| 2008/0311864 A1 | 12/2008 | Wallis | |
| 2009/0181673 A1* | 7/2009 | Barrett ......................... 455/436 |

FOREIGN PATENT DOCUMENTS

WO   WO 2010/030212      3/2010

OTHER PUBLICATIONS

U.S. Appl. No. 12/862,744, filed Aug. 24, 2010.
U.S. Appl. No. 12/960,108, filed Dec. 3, 2010.
U.S. Appl. No. 13/024,318, filed Feb. 9, 2011.

\* cited by examiner

*Primary Examiner* — Chirag Shah
*Assistant Examiner* — Ashley Shivers (57) ABSTRACT

Disclosed is a method the present method may help to minimize or avoid ping-ponging between coverage areas of a wireless communication system, by having a radio access network (RAN) give special consideration to power control commands after receipt of a wireless communication device's (WCD's) handoff request. After the RAN receives the WCD's request for handoff from a first coverage area to a second coverage area, the RAN evaluates power control commands from the WCD for the first coverage area for a time period after the handoff request and, based on the evaluation, determines whether the WCD continues to experience poor RF conditions in the first coverage area 22. If so, the RAN may then allow the handoff (e.g., if other conditions such as channel resource availability are met). And otherwise, the RAN may abort the handoff.

14 Claims, 4 Drawing Sheets

METHOD FOR MANAGING HANDOFF IN A WIRELESS COMMUNICATION SYSTEM

BACKGROUND

In a typical cellular wireless communication system, a radio access network (RAN) includes a plurality of base stations, each of which radiates to define one or more coverage areas such as a cell and cell sectors in which wireless communication devices (WCDs) can be served by the RAN and can thereby obtain connectivity with broader networks such as the public switched telephone network (PSTN) and the Internet.

A RAN will typically communicate with served WCDs according to an agreed air interface protocol, examples of which include CDMA (e.g., 1xRTT or 1xEV-DO), iDEN, WiMAX, LTE, GSM, HSDPA, and others now known or later developed. Communications in the direction from the RAN to WCDs define a "forward link", while those in the direction from WCDs to the RAN define a "reverse link".

Air interface communications in each coverage area may occur on one or more carrier frequencies, such as one frequency for forward link communications and another frequency for reverse link communications. Further, depending on the air interface protocol, the air interface may be divided into particular channels through a mechanism such as time division multiplexing, code division multiplexing, and/or frequency division multiplexing, for instance. By way of example, the forward link may define a pilot channel on which the RAN broadcasts a pilot signal for use by WCDs to detect and evaluate coverage, a paging channel on which the RAN may page WCDs, and one or more traffic channels on which the RAN transmits bearer data to WCDs that are actively engaged in calls (e.g., voice calls or data communications). The reverse link, on the other hand, may define an access channel on which WCDs may initiate calls and other communications, a power control channel on which WCDs may signal to the RAN to cause the RAN to adjust transmission power for traffic channel communications to the WCD, and one or more traffic channels on which WCDs may transmit bearer traffic to the RAN.

In general, when a WCD is actively engaged in a call in a coverage area of the RAN, the WCD may regularly monitor the strength (e.g., signal to noise ratio) of the pilot signal broadcast by the RAN in that coverage area and the strength of pilot signals broadcast by the RAN in other coverage areas extending to the WCD's position. If the WCD detects a pilot signal from another coverage area that is sufficiently stronger than the pilot signal of the WCD's current coverage area, the WCD may transmit a signal to the RAN to request a handoff of the call to the detected coverage area. The RAN may then determine if sufficient traffic channel resources exist in the new coverage area and, if so, may then assign traffic channel resources to the WCD for use in the new coverage area and direct the WCD to continue the call in the new coverage area.

Under some air interface protocols, a WCD may also be capable of engaging in a call actively in multiple coverage areas at once. In such an arrangement, the WCD may have an "active set" of coverage areas in which the WCD simultaneously exchanges bearer traffic with the RAN. In this arrangement, the WCD may regularly monitor the strength of pilot signals that it receives in each of its active set coverage areas as well as pilot signals broadcast in other coverage areas. If the WCD thereby detects a pilot signal from another coverage area that is sufficiently stronger than the weakest pilot signal of the coverage areas in the WCD's active set, the WCD may the signal to the RAN to request a handoff from that weakest coverage area to the newly detected coverage area. And the RAN may likewise assign traffic channel resources to the WCD in the newly detected coverage area and allow the call to continue with a revised active set.

Furthermore, while a WCD is actively engaged in a call, the WCD and RAN may engage in a power control process to help control the power level at which the RAN transmits bearer traffic to the WCD on a forward link traffic channel. A goal of this process is to keep the traffic channel transmission power at a level that is sufficiently high to allow the WCD to receive traffic communications from the RAN but not so high as to unduly interfere with other air interface communications, such as communications to and from other WCDs.

In an example traffic channel power control process, the WCD repeatedly measures the power level of traffic channel communications that the WCD is receiving from the RAN and compares the measured power level with a dynamically defined setpoint value. Based on each comparison, the WCD then sends a power control command, such as a Boolean value, to the RAN to cause the RAN to either increment or decrement the RAN's traffic channel transmission power. For instance, when the comparison shows that the received traffic channel power is greater than the setpoint, the WCD may transmit a power-down command to the RAN, and the RAN would responsively decrement its traffic channel transmission power. On the other hand, when the comparison shows that the received traffic channel power is less than the setpoint, the WCD may transmit a power-up command to the RAN, and the RAN would responsively increment its traffic channel transmission power. (In the event the received power equals the setpoint, the WCD may alternate between transmission of power-up and power-down commands to the RAN, to help maintain the transmission power at that level.)

In a system where a WCD operates with an active set, the WCD may apply this power control process for each coverage area in the WCD's active set, and the RAN may be arranged to adjust traffic channel transmission power to the WCD based on the power-control commands received for the group of active set coverage areas. For instance, the RAN may be arranged to increment its traffic channel transmission power in each active set coverage area if the WCD sends power-up commands in all of the active set coverage areas, but to decrement its traffic channel transmission power in each active set coverage area if the WCD sends a power-down command in any of the active set coverage areas.

OVERVIEW

The handoff process described above may work well in many cases. However, a problem can arise in a scenario where a WCD is at a border of two coverage areas and the WCD "ping-pongs" back and forth between the coverage areas. This can happen if a WCD is near the edge of either or both of the coverage areas, particularly if the air interface conditions in the coverage areas change due to variations in load or for other reasons.

For example, when the WCD is operating at the outer edge of coverage area A and is simultaneously in an outer edge of coverage area B, the WCD may determine that the pilot signal from coverage area B is threshold strong, and the WCD may responsively work with the RAN to hand off from coverage area A to coverage area B. Shortly thereafter, however, due to changes in system load or for other reasons, the WCD may then detect that the pilot strength from coverage area A is threshold strong and may responsively work with the RAN to hand off back to coverage area A. This back and forth handoff process may then continue repeatedly.

When a WCD ping-pongs between coverage areas, signaling and processing resources of the WCD and the RAN may be used wastefully. Furthermore, each time the WCD hands off between coverage areas, there is a risk that the handoff may fail for one reason or another, and that the WCD may experience a call drop. This risk is particularly acute when the handoff is between coverage areas that operate on different carrier frequencies, but the risk exists generally.

Disclosed herein is a method to help prevent or minimize ping-ponging, by conditioning grant of a WCD's handoff request on a determination that the WCD continues to experience threshold poor conditions in its current coverage area after the WCD makes the handoff request. Furthermore, the method does this in an innovative manner, by evaluating power control commands from the WCD for a time period after the handoff request and thereby determining whether the WCD is continuing to experience threshold poor conditions in its current coverage area. In particular, based on the evaluation of power control commands after the handoff request, if the RAN determines that the WCD is continuing to experience threshold poor conditions in its current coverage area after the WCD sent the handoff request, then (assuming any other relevant conditions are met (such as the availability of traffic channel resources in the target coverage area)), the RAN would grant the handoff request. On the other hand, if the RAN determines that the WCD is not continuing to experience threshold poor conditions in its current coverage area after the WCD sent the handoff request, then the RAN would abort the handoff process.

The RAN's evaluation of the WCD's power control commands as a basis to condition grant of a handoff request may take various forms. By way of example, the RAN may determine whether all of the power control commands that the WCD sends in a defined time period subsequent to the handoff request are power-up commands. If so, the RAN may conclude that the WCD is continuing to experience threshold poor conditions in its current coverage area, and the RAN may responsively allow the handoff. On the other hand, if the RAN receives at least one power-down command (or some designated threshold number of power-down commands) from the WCD in the time period, the RAN may conclude that the WCD's current receive power is adequate, and the RAN may responsively abort the handoff process.

As another example, the RAN may determine whether punched-in bits among the WCD's power control commands in the time period following the handoff request indicate that the WCD is continuing to experience threshold poor conditions in its current coverage area. In this embodiment, after sending the handoff request, the WCD may be arranged to periodically punch-in special bits among its power control commands, to indicate whether the signal strength (e.g., pilot or traffic channel signal strength) that the WCD is detecting from its current coverage area remains lower than a threshold level that is itself lower than the power control setpoint. Correspondingly, the RAN may be arranged to evaluate those periodically punched-in bits after receiving the handoff request, to determine whether the punched-in bits indicate that the WCD is continuing to detect the threshold poor conditions in its current coverage area. If so, the RAN may responsively allow the handoff. But if not, the RAN may abort the handoff process.

As yet another example, the RAN may determine whether the RAN is no longer receiving power control commands from the WCD in the WCD's current coverage area. The absence of power control commands from the WCD may indicate that the WCD has already lost communication with the RAN in that coverage area and thus may justify grant of the WCD's request to hand off from that coverage area. Thus, if the RAN determines that the power control commands from the WCD in a defined time period subsequent to the handoff request are absent (e.g., begin to be absent), then the RAN may allow the handoff. And otherwise, the RAN may abort the handoff process.

These as well as other aspects, advantages, and alternatives will become apparent to those of ordinary skill in the art by referring to the following detailed description, with reference where appropriate to the accompanying drawings. Further, it should understood that the description provided throughout this document, including in this overview section, is intended to illustrate the invention by way of example and without limitation.

DETAILED DESCRIPTION

The present method will now be described with reference to the figures. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as a WCD or a base station (or other network component), it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

Referring to the drawings, as noted above, FIG. 1 is a simplified block diagram of a cellular wireless communication system in which the present method can be implemented. The system includes at its core a radio access network (RAN) 12 that functions to provide served WCDs with communication service, such as access to one or more transport networks 14 for instance. As shown, the example RAN 12 includes one or more base transceiver stations (BTSs) 16, one or more base station controllers (BSCs) 18, and one or more switches/gateways 20 providing connectivity with transport networks 14. A suitable RAN can take other forms as well, ranging in degree of complexity and scope of operation.

Figure 1:
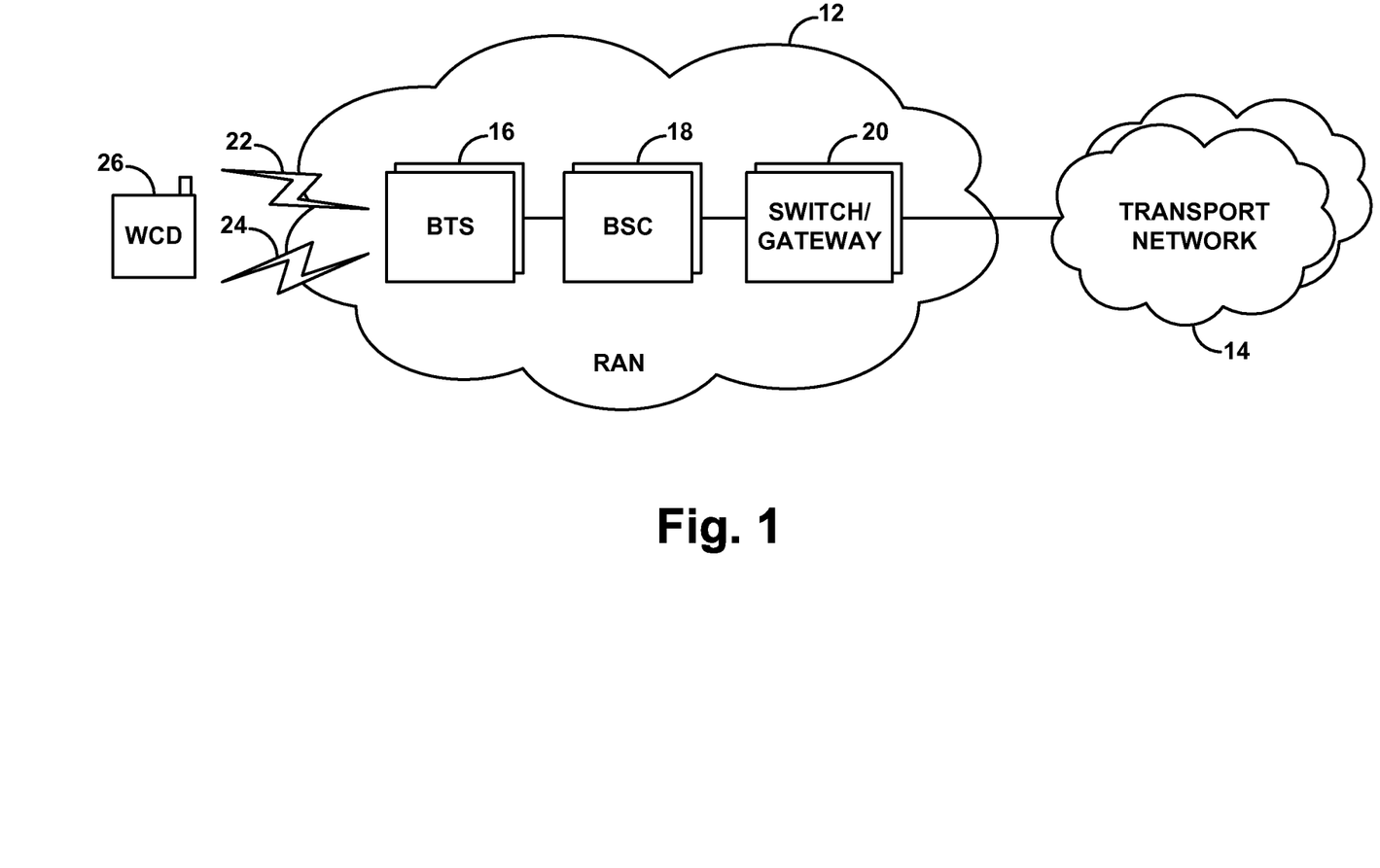
FIG. 1 is a simplified block diagram of a cellular wireless communication system in which the present method can be implemented.

Each BTS preferably includes one or more antenna arrangements and associated equipment so that the BTS radiates to define one or more wireless coverage areas, such as cell sectors for instance, in which WCDs may operate. FIG. 1 depicts two representative coverage areas 22, 24 by way of example. These two coverage areas may emanate from a common base station or may emanate from separate base stations. Further, the coverage areas may operate on the same carrier frequency as each other, or on different carrier frequencies.

FIG. 1 further depicts a representative WCD 26 positioned in an area of possible overlap between coverage areas 22 and 24. WCD 26 may be a cellular telephone, wirelessly equipped personal digital assistant or personal computer, wirelessly equipped tracking device, or other wirelessly equipped device arranged to be served by RAN 12.

In each coverage area, communications between the serving BTS and served WCDs, such as WCD 26, may be compliant with one or more air interface protocols, such as one of the air interface protocols noted above for instance. As such, each coverage area may provide a pilot signal that served WCDs can detect and use as a basis to evaluate for possible handoff between coverage areas. In addition, each coverage area may provide one or more forward link and reverse link traffic channels that the RAN can allocate for use to exchange bearer traffic with particular served WCDs. Further, each coverage area may provide a mechanism, such as a reverse power control channel, through which served WCDs can send power control commands to the RAN to adjust forward traffic channel transmission power.

In practice, when a WCD first powers on in or otherwise enters a coverage area of the RAN, the WCD may scan for a strongest pilot signal and may then register with the RAN in the coverage area that provides that pilot signal. The WCD may then rest in an "idle" state in that coverage area, awaiting call origination.

When an idle WCD seeks to originate a call, in response to a page message from the RAN or a user request for instance, the WCD may transmit an origination message to the RAN via a reverse access channel in the coverage area where the WCD is idling. In response, the RAN may then determine whether sufficient traffic channel resources are available to support the call in that coverage area and, if so, may transmit to the WCD a traffic channel assignment message, assigning the WCD to operate on a particular traffic channel (e.g., a particular forward link traffic channel and a particular reverse link traffic channel) in the coverage area. The WCD may then proceed with the call, in an "active" state.

As noted above, when the WCD is actively engaged in a call, the WCD may continue to monitor pilot signal strength in its current coverage area and in other coverage areas. If the WCD thereby detects a pilot signal that is sufficiently stronger than that in its current coverage area, the WCD may then signal to the RAN to request handoff of the call to the other coverage area (target coverage area). In practice, for instance, the WCD may transmit to the RAN a pilot strength management message (PSMM) or the like that specifies the pilot signal strength (e.g., signal-to-noise ratio) of the WCD's current coverage area and the pilot signal strength of the target coverage area.

Upon receipt of a handoff request, the RAN (e.g., the currently serving BTS or BSC) may then determine whether the reported pilot signal strength of the target coverage area is sufficiently higher than the pilot reported pilot signal strength of the current coverage area. If so, the RAN may further determine if sufficient traffic channel resources are available to support the call in the target coverage area. If so, the RAN may then transmit to the WCD a handoff direction message and traffic channel assignment message, directing the WCD to operate on a particular traffic channel (e.g., a particular forward link traffic channel and a particular reverse link traffic channel) in the target coverage area. The WCD may then transition to continue the call on the assigned traffic channel in the target coverage area.

As noted above, some air interface protocols further allow a WCD to operate concurrently in multiple active set coverage areas at once. In practice, for instance, the WCD may begin a call with a single coverage area in its active set, and through a handoff process similar to that described above, the WCD may work with the RAN to add other coverage areas to the active set, up to a defined limit such as three or six coverage areas for instance. From that point forward, the handoff process may function to replace one or more coverage areas in the WCD's active set with one or more other coverage areas, advantageously while allowing communication to continue seamlessly in one or more other coverage areas of the active set. In still other implementations, a RAN may initially assign a WCD to operate in multiple coverage areas at the time of call origination, through a channel access into soft handoff (CASHO) process.

In a typical handoff process, as noted above, a WCD will monitor pilot signal strength in the WCD's current coverage area(s) and in other coverage areas, and if the WCD detects another coverage area having threshold high pilot signal strength compared with the WCD current coverage area(s), the WCD may signal to the RAN to request handoff to the other coverage area. Pilot signal strength in each such coverage area can be measured as a signal-to-noise ratio, such as a ratio of signal energy to spectral density ($E_c/I_o$) for instance.

Upon detecting a coverage area with threshold high signal strength, the WCD may then send a handoff request in the form of a pilot strength management message (PSMM) or the like to the RAN, as overhead data on a reverse traffic channel of the WCD's call. The PSMM may identify the target coverage area and the measured pilot strength of the target coverage area, as well as pilot strengths of the WCD's currently serving coverage area(s). At the recipient BTS or a serving BSC for instance, the RAN may then determine whether the reported pilot strength of the target coverage area is sufficiently high compared with the reported pilot strength of the WCD's currently serving coverage area(s) and whether the RAN has sufficient channel resources available in the target coverage area to support the call. If so, the RAN may then grant the handoff request, by sending a handoff direction message or the like to the WCD, providing the WCD with channel assignment information for the target coverage area and perhaps providing the WCD with a revised list of active set coverage areas in which the WCD should operate. Through this process, the WCD may thus transition to continue the call in the target coverage area, in place of a coverage area in which the WCD was occurring.

In some implementations, it is also possible that a WCD may detect threshold weak pilot signal strength in all available coverage areas under a particular carrier frequency on which the WCD is operating, and the WCD may begin scanning for coverage under one or more other carrier frequencies instead. For instance, upon detecting threshold low pilot strength, the WCD may send a PSMM to the RAN, and the RAN may responsively transmit to the WCD a carrier frequency search request message (CFSRQM) directing the WCD to scan for a strongest pilot under one or more designated other carrier frequencies. After responsively doing so, the WCD may then send a carrier frequency search response message (CFSRPM) to the RAN reporting the detected coverage area and pilot strength. In this case similar to that above, the RAN may then check determine if sufficient channel resources are available in the reported coverage area and, if so, may then send an handoff direction message to the WCD to cause the WCD to transition the call over to the specified coverage area, i.e., to engage in an inter-frequency handoff.

Figure 2:
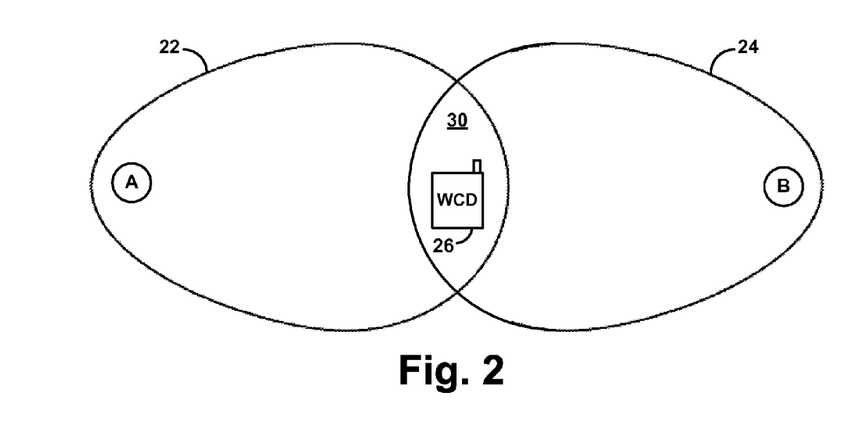
FIG. 2 is an illustration of overlapping coverage areas for a potential handoff scenario.
Figure 3:
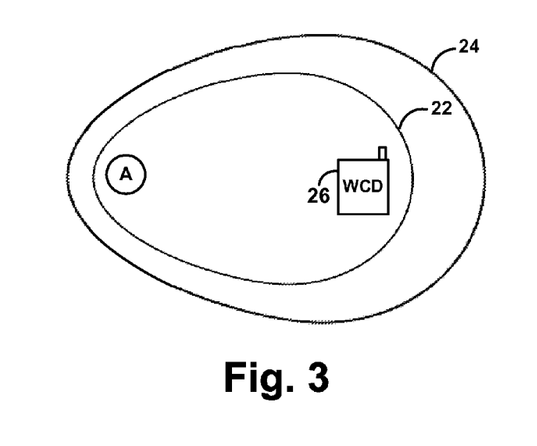
FIG. 3 is another illustration of overlapping coverage areas for a potential handoff scenario.

FIGS. 2 and 3 depict example scenarios where a WCD may hand off from one coverage area to another. The coverage areas are designated by reference numerals 22 and 24 for consistency with FIG. 1.

In FIG. 2, coverage areas 22 and 24 are shown as emanating from different base stations and as partially overlapping. In particular, coverage area 22 is shown emanating from base station A, and coverage area 24 is shown emanating from base station B, and the two coverage areas overlap to define an overlap-area 30. As shown in this arrangement, WCD 26 may be positioned in overlap-area 30 and is at a coverage area somewhat distant from both base stations A and B. For simplicity, we can assume for purposes of this example only that no other coverage areas are involved.

In the arrangement of FIG. 2, base stations A and B may operate on a common carrier frequency (but may have their respective communications modulated uniquely per coverage area in order to distinguish communications in one coverage area from those in the other coverage area). In practice with this arrangement, if WCD 26 is engaged in a call (e.g., voice call or data session) in coverage area 22, the WCD may for one reason or another begin to detect a threshold stronger pilot signal from coverage area 24, and the WCD may responsively signal via coverage area 22 to the RAN to request handoff. The RAN may then assign a channel resources for the WCD in coverage area 24 and direct the WCD to hand off to coverage area 24, and the WCD may responsively do so. However, as noted above, this process may then occur in reverse, with the WCD then for one reason or another detecting a threshold stronger pilot from coverage area 22 and responsively signaling with the RAN to effect handoff back to coverage area 22. Further, this wasteful ping-ponging may continue.

Alternatively, in the arrangement of FIG. 2, base stations A and B may operate on different carrier frequencies. In that case, if the WCD is engaged in a call in coverage area 22 and begins to detect threshold poor pilot strength there, the WCD may begin scanning for coverage on the carrier frequency of coverage area 24 and as a result may discover a threshold strong enough pilot from coverage area 24. The WCD may then report this detected pilot to the RAN, and the RAN in turn direct the WCD to hand off to coverage area 24, i.e., to engage in an inter-frequency handoff. As with the scenario above, however, this process may then repeat in reverse, with the WCD handing off from coverage area 24 back to coverage area 22, and so forth. With each of these inter-frequency handoffs, there is a particular risk of a call drop, and thus it would be best to avoid such a handoff if it not strictly necessary.

FIG. 3 depicts another arrangement where handoff, and particularly inter-frequency handoff, may occur. In FIG. 3, coverage areas 22 and 24 both emanate from a common base station A. The coverage areas may operate on different modulation parameters and/or different carrier frequencies and may largely coterminous or may vary in scope based on propagation differences. Propagating in largely the same direction and covering somewhat of the same area from base station A, the coverage areas may be considered to be in the same sector but yet may be discrete coverage areas due to their different modulation and/or frequency channels.

In the arrangement of FIG. 3, WCD 26 is shown at the edge of coverage area 22, and we can again assume that the WCD is engaged in a call through coverage area 22. Here as in FIG. 2, the WCD may then detect a threshold stronger pilot from coverage area 24 and may work with the RAN to hand off to coverage area 24. Further, as loading or other conditions change or for other reasons, the WCD may likewise begin ping-ponging back and forth between the coverage areas.

As further noted above, when a WCD is engaged in a call (e.g., voice call or data session), the WCD and RAN may engage in a process to control transmission power on the forward link traffic channel to the WCD. In particular, as noted, the WCD may repeatedly compare strength of received traffic channel communications with a defined (or dynamically established) setpoint, and for each comparison the WCD may transmit to the RAN a respective power control command based on the setpoint comparison, to cause the RAN to increase or decrease forward link traffic channel transmission power. In an example implementation, the WCD may thus transmit to the RAN a continuous series of these power control commands on a reverse power control channel or as overhead data interleaved with other data such as reverse link traffic channel communications. Each such command may take the form of a bit providing a Boolean directive to increase or decrease transmission power. For instance, a "1" bit may cause the RAN to increase traffic channel transmission power to the WCD, whereas a "0" bit may cause the RAN to decrease traffic channel transmission power to the WCD. Thus, the series of power control commands may comprise a series of bits.

In practice, the BTS serving the WCD may have a variable power amplifier to facilitate adjusting the power at which the BTS transmits on the traffic channel to the WCD. Thus, as the BTS receives a power up command from the WCD, the BTS may adjust the power amplifier to increment traffic channel transmission power. And as the BTS receives a power down command from the WCD, the BTS may adjust the power amplifier to decrement traffic channel transmission power. In some implementations, control of this transmission power may occur solely at the BTS, with the BTS receiving and responding to the power control commands. In other implementations, control of this transmission power may occur in part at a separate BSC, with the BSC receiving the power control commands via the BTS and the BSC responsively directing the BTS to adjust transmission power accordingly.

As noted above, the present method may help to minimize or avoid ping-ponging between coverage areas by having the RAN give special consideration to power control commands after receipt of a WCD's handoff request. In particular, as noted above, after the RAN receives a WCD's request for handoff from coverage area 22 to coverage area 24, the RAN may then evaluate power control commands from the WCD for coverage area 22 for a time period after the handoff request and, based on the evaluation, determine whether the WCD continues to experience poor RF conditions in coverage area 22. If so, the RAN may then allow the handoff (e.g., if other conditions such as channel resource availability are met). And otherwise, the RAN may abort the handoff (e.g., deny the request, or revoke a handoff-grant).

The time period of analysis after the handoff request may begin upon receipt of the handoff request of at some moment after that and may extend for a defined duration, such as a duration that would cover a sufficient number of power control commands to provide useful information, but not being so long as to unduly risk call drop by delaying handoff if necessary. Further, the power control commands at issue here are preferably power control commands for the coverage area from which the WCD is seeking to hand off, in this case coverage area 22.

As noted above, one evaluation that the RAN can make as a basis to condition grant of a handoff request is whether all of the power control commands that the RAN receives from the WCD in the time period are power-up commands. All of the power control commands for coverage area 22 being power-up commands indicates that the WCD is continuing to receive traffic channel communications in coverage area 22 at a level lower than the power control setpoint, notwithstanding the likely fact that the RAN was continuing to responsively increase forward link transmission power to the WCD. This would suggest continued poor conditions in coverage area 22 and thus justify granting a request to hand off from that coverage area. Thus, as noted above, if for the duration of the time period the RAN receives only power-up commands from the WCD for coverage area 22, then the RAN may allow the handoff. However, if in the time period the RAN receives from the WCD at least one power-down command for coverage area 22, then the RAN may abort the handoff.

As another example, as noted above, the RAN may condition grant of the handoff request on a determine that particular punched-in bits among the WCD's power control commands in the time period indicate the WCD is continuing to experience threshold poor conditions in coverage area 22. To facilitate this, the WCD may be arranged (e.g., programmed) to borrow some of the bits in the series of power control commands for use to indicate whether the WCD is still receiving threshold weak forward link transmission in coverage area 22, such as threshold weak pilot signal strength and/or threshold weak traffic channel communication. Further, the RAN (e.g., BTS and/or BSC) would be arranged (e.g., programmed) to look for such bits and to treat them as these special indicator bits rather than as traditional power control commands.

If this analysis is with respect to pilot strength, the issue could be whether the pilot signal strength is equal to or lower than the weak pilot signal strength that triggered the handoff request in the first place. Alternatively or additionally, if the analysis is with respect to traffic channel communication, the issue could be whether the traffic channel receive strength is lower than a threshold that is itself lower than the setpoint; thus, these special indicator bits punched-in to the series of power control commands sent by the WCD to the RAN provide a special indication beyond the normal power control indication of whether received traffic channel strength is lower or higher than the setpoint.

Figure 4:
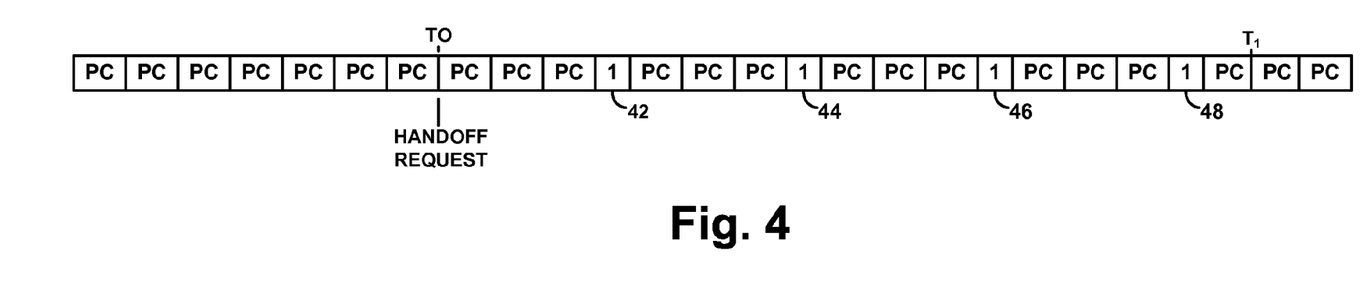
FIG. 4 is an illustration of a series of power control commands with punched-in bits indicating whether conditions remain threshold poor.
Figure 5:
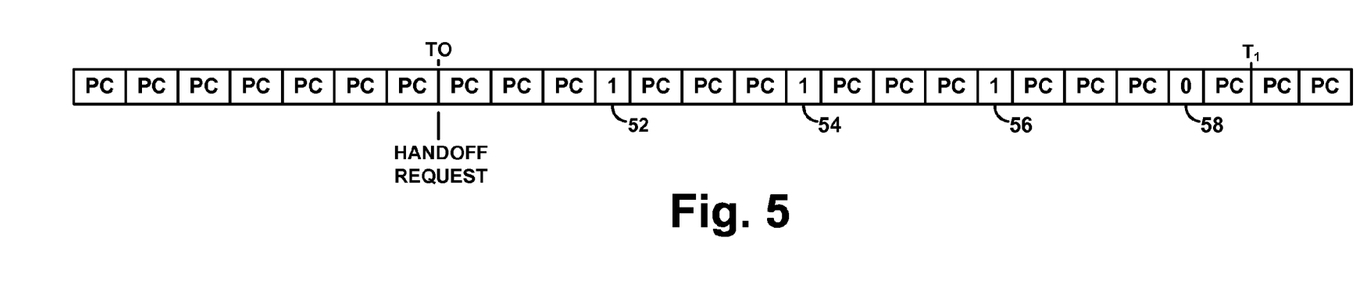
FIG. 5 is another illustration of a series of power control commands with punched-in bits indicating whether conditions remain threshold poor.

FIGS. 4 and 5 depict an example of a series of bits generally representing power control commands sent from a WCD to a RAN, to illustrate how special threshold bits can be punched-in pursuant to this implementation. As shown in FIGS. 4 and 5, the series of bits constitute normal power control (PC) bits as the WCD engages in a call. At time $T_0$, the WCD then sends a handoff request to the RAN, seeking permission to hand off from coverage area 22 to coverage area 24. At that point, the WCD then programmatically begins punching-in every fourth bit (or at some other agreed frequency) a special bit (42-48 in FIGS. 4 and 52-58 in FIG. 5) indicating whether the WCD is continuing to experience threshold poor conditions in coverage area 22, determined in the manner described above for instance. For purposes of illustration, the system might be designed such that a "1" bit indicates the conditions are still threshold poor, whereas a "0" bit indicates the conditions are not still threshold poor.

In FIG. 4, each of the punched-in bits 42-48 for a defined time period extending from $T_0$ to $T_1$ is a "1" bit, indicating that the WCD continues to experience threshold poor conditions in coverage area 22. Thus, upon expiration of the time period, due to those indications, the RAN may then allow the handoff.

In FIG. 5, on the other hand, after a number of punched-in bits 52-56 being "1" bits, the RAN may detect one punched-in bit 58 (or perhaps some other designated threshold number of punched-in bits) being "0" and thus indicating that the WCD is not continuing to experience the threshold poor conditions in coverage area 22. Thus, at that point, the RAN may abort the handoff, such as by sending a handoff rejection message, disregarding the handoff request (sending no response), or perhaps revoking an indication that handoff would be allowed.

Finally, as also noted above, another basis for conditioning grant of the handoff request may be a determination that the RAN has stopped receiving power control commands from the WCD in coverage area 22. The absence of such commands may indicate that the WCD has already lost contact with coverage area 22, thus justifying grant of the request to hand off from coverage area 22.

Figure 6:
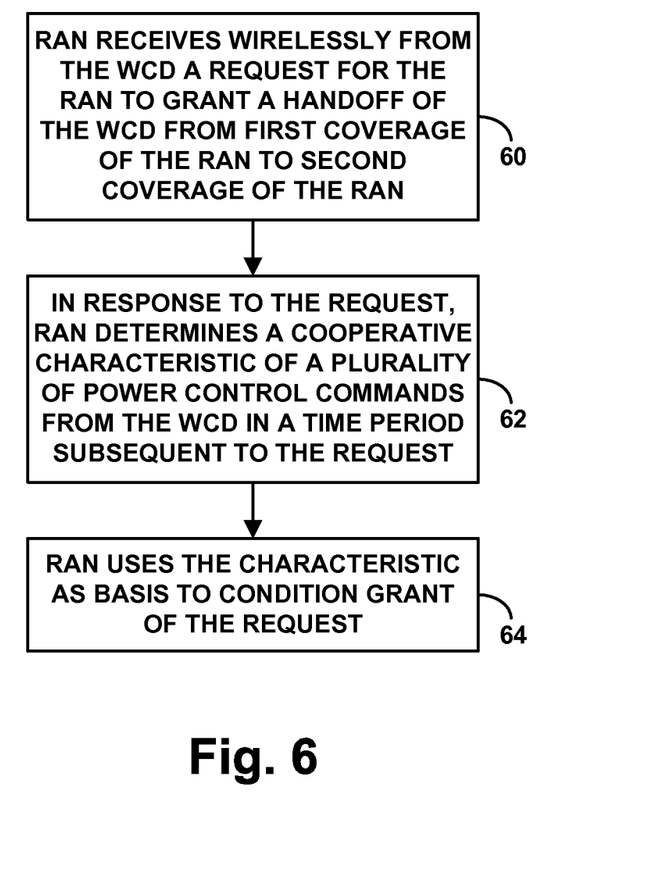
FIG. 6 is a flow chart depicting functions that can be implemented in accordance with the present method.

FIG. 6 is next a flow chart summarizing operation of an example implementation of the present method. The method of FIG. 6 functions to manage handoff in a wireless communication system in which a RAN serves a WCD and receives wirelessly from the WCD a sequence of power control commands requesting the RAN to adjust forward link transmission power used by the RAN for transmission to the WCD.

As shown in FIG. 6, at block 60, the RAN receives wirelessly from the WCD a request for the RAN to grant a handoff of the WCD from first coverage of the RAN to second coverage of the RAN. At block 62, in response to the request, the RAN determines a cooperative characteristic of a plurality of power control commands from the WCD in a time period subsequent to the request. As noted above, the power control commands may be for the coverage area from which the WCD is seeking to hand off, and the cooperative characteristic may be, by way of example, (i) all of the power control commands being power-up commands, (ii) punched-in bits among the commands indicating continued threshold poor conditions in the coverage area, and/or (iii) absence of the power control commands. Finally, at block 64, the RAN may then use the characteristic as a basis to condition grant of the request.

An exemplary embodiment of the invention has been described above. Those of ordinary skill in the art will appreciate that variations from the embodiment described are possible while remaining within the true spirit and scope of the invention.

What is claimed is:

1. A method of managing handoff in a wireless communication system in which a radio access network (RAN) serves a wireless communication device (WCD) and receives wirelessly from the WCD a sequence of power control commands requesting the RAN to adjust forward link transmission power used by the RAN for transmission to the WCD, wherein each power control command received from the WCD is selected from the group consisting of (i) a power-up command sent by the WCD in response to the WCD detecting forward link signal strength lower than a set point and (ii) a power-down command sent by the WCD in response to the WCD detecting forward link strength higher than the set point, the method comprising:

receiving into the RAN, wirelessly from the WCD, a request for the RAN to grant a handoff of the WCD from first coverage of the RAN to second coverage of the RAN;

responsive to the request, the RAN determining a cooperative characteristic of a plurality of power control commands from the WCD in a time period subsequent to the request, wherein the cooperative characteristic of the plurality of power control commands from the WCD for the time period subsequent to the request comprises the power control commands in the time period being a continuous series of power-up commands; and the RAN using the characteristic as a basis to condition grant of the request, wherein if the power control commands in the time period are all power-up commands, then the RAN grants the request, and if any of the power control commands in the time period is a power-down command, then the RAN does not grant the request.

2. The method of claim 1, wherein the first coverage is a first frequency channel in a particular cell sector defined by the RAN, and the second coverage is a second frequency channel also in the particular cell sector defined by the RAN.

3. The method of claim 1, wherein the handoff is an inter-frequency handoff.

4. The method of claim 1, wherein the handoff is an intra-frequency handoff.

5. The method of claim 1, wherein the cooperative characteristic comprises an absence of power control commands from the WCD.

6. A method of managing handoff in a wireless communication system, the method comprising:

a radio access network (RAN) receiving wirelessly from a wireless communication device (WCD) served by the RAN a request for handoff of the WCD from first coverage of the RAN to second coverage of the RAN;

responsive to the request, the RAN determining whether a series of power control bits that the RAN receives wirelessly from the WCD during a time period after receipt of the request has a particular characteristic, wherein the power control bits define commands each selected from the group consisting of (i) a power-up command sent by the WCD in response to the WCD detecting forward link signal strength lower than a set point and (ii) a power-down command sent by the WCD in response to the WCD detecting forward link strength higher than the set point, wherein the WCD periodically punches-in among the power control bits indications of whether forward link signal strength detected by the WCD is lower than a threshold, the threshold being lower than the set point, and wherein the particular characteristic comprises a plurality of the periodically punched-in indications being that the forward link signal strength detected by the WCD is lower than the threshold;

if the RAN determines that the series of power control bits has the particular characteristic, then the RAN granting the request and thus causing the WCD to hand off from the first coverage to the second coverage; and if the RAN determines that the series of power control bits does not have the particular characteristic, then the RAN not granting the request.

7. The method of claim 6, wherein the particular characteristic comprises the series of power control bits defining a series of power-up commands and no power-down commands.

8. A method in a wireless communication system in which a WCD that is actively being served by a radio access network (RAN) normally transmits a continuous series of power control bits to the RAN, each power control bit representing (i) a power-up command if the WCD detects forward link signal strength lower than a set point or (ii) a power-down command if the WCD detects forward link signal strength higher than the set point, the method comprising:

when the WCD is operating in first coverage of the RAN, the WCD detecting a handoff trigger comprising threshold low forward link signal strength of the first coverage, and, in response to the detecting, the WCD sending a signaling message to the RAN;

after detecting the handoff trigger, the WCD periodically substituting for a power control bit of the series a handoff trigger bit indicating whether the WCD still detects the handoff trigger;

responsive to the signaling message, the RAN determining whether a plurality of power control bits from the WCD after the RAN receives the signaling message cooperatively have a particular characteristic, as an indication at least that the WCD continues to detect the handoff trigger to at least a threshold extent after the WCD sent the signaling message to the RAN, wherein the particular characteristic comprises a threshold extent of the handoff trigger bits indicating that the WCD still detects the handoff trigger, wherein the threshold extent of the handoff trigger bits indicating that the WCD still detects the handoff trigger comprises a threshold greater number of the handoff trigger bits indicating that the WCD detects the handoff trigger than indicating that the WCD does not detect the handoff trigger; and responsive to determining that the plurality of power control bits from the WCD cooperatively have the particular characteristic, the RAN causing the WCD to hand off from the first coverage to second coverage of the RAN.

9. The system of claim 8, wherein the first coverage is a first frequency channel in a particular cell sector defined by the RAN, and the second coverage is a second frequency channel also in the particular cell sector defined by the RAN.

10. The method of claim 8, wherein the handoff trigger further comprises threshold strong forward link signal strength of the second coverage.

11. The method of claim 8, wherein causing the WCD to hand off from the first coverage to the second coverage comprises sending to the WCD a traffic channel assignment for the second coverage.

12. A method of managing handoff in a wireless communication system in which a radio access network (RAN) serves a wireless communication device (WCD) and receives wirelessly from the WCD a sequence of power control commands requesting the RAN to adjust forward link transmission power used by the RAN for transmission to the WCD, the method comprising receiving into the RAN, wirelessly from the WCD, a request for the RAN to grant a handoff of the WCD from first coverage of the RAN to second coverage of the RAN;

responsive to the request, the RAN determining a cooperative characteristic of a plurality of power control commands from the WCD in a time period subsequent to the request, wherein determining the cooperative characteristic comprises evaluating periodically punched-in bits among power control commands from the WCD in the time period, to determine whether the periodically punched-in bits meet a defined condition; and the RAN using the characteristic as a basis to condition grant of the request, wherein if the periodically punched-in bits among the power control commands from the WCD in the time period meet the defined condition, then the RAN grants the request, and if the periodically punched-in bits among the power control commands from the WCD in the time period do not meet the defined condition, then the RAN does not grant the request.

13. The method of claim 12, wherein each power control command received from the WCD is selected from the group consisting of (i) a power-up command sent by the WCD in response to the WCD detecting forward link signal strength lower than a set point and (ii) a power-down command sent by the WCD in response to the WCD detecting forward link strength higher than the set point, and wherein the defined condition comprises all of the periodically punched-in bits among the power control commands from the WCD in the time period being set in a common state that indicates the WCD detected forward link signal strength lower than a threshold, the threshold being lower than the set point.

14. The method of claim 13, further comprising:

providing the WCD, wherein the WCD is arranged to determine whether the forward link signal strength is lower than the threshold and (i) if so, to punch-in a bit, of the periodically punched-in bits, indicating that the WCD detected forward link signal strength lower than the threshold and (ii) if not, to punch-in a bit, of the plurality of punched-in bits, indicating that the WCD did not detect forward link signal strength lower than the threshold.

\* \* \* \* \*